UNITED STATES PATENT OFFICE.

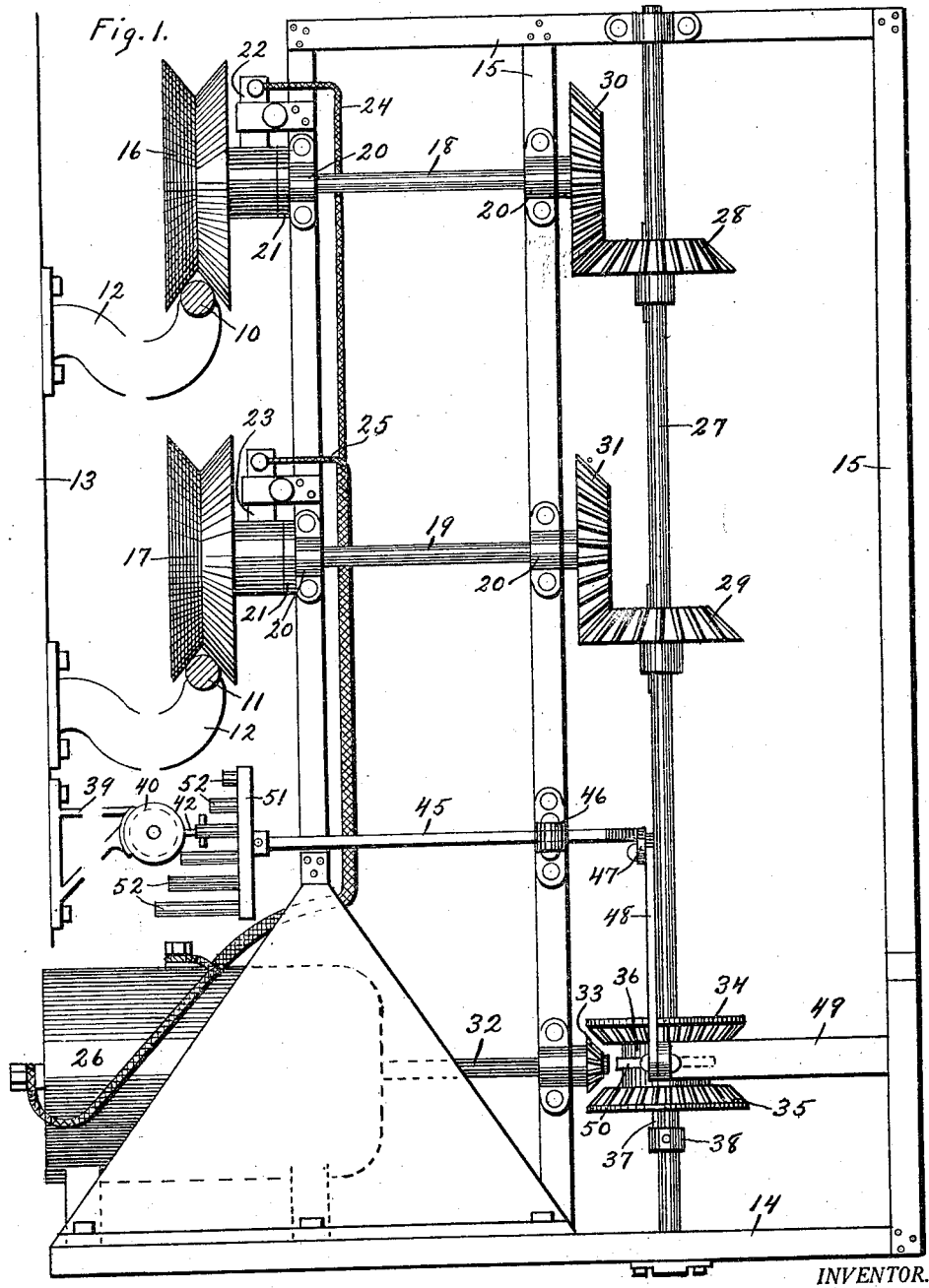

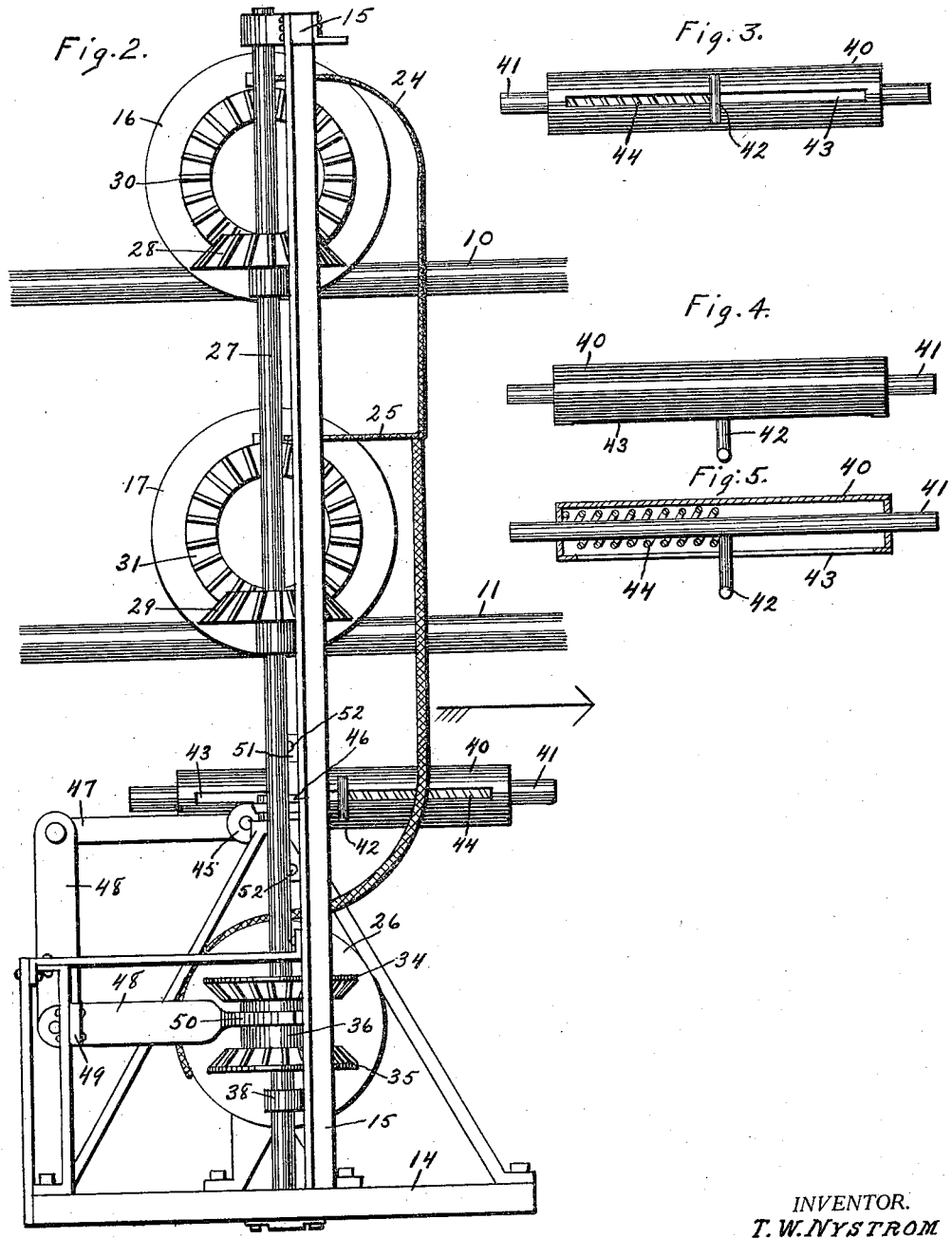

THEODORE WM. NYSTROM, OF ROCK RAPIDS, IOWA.

AERIAL MOTOR-CARRIAGE.

1,279,140. Specification of Letters Patent. Patented Sept. 17, 1918.

Application filed October 26, 1917. Serial No. 198,720.

*To all whom it may concern:*

Be it known that I, THEODORE W. NYSTROM, a citizen of the United States, and resident of Rock Rapids, Lyon county, Iowa, have invented a new and useful Aerial Motor-Carriage, of which the following is a specification.

The object of this invention is to provide an electric aerial system and device for the purpose of delivering parcels or mail matter or the like from a central point to outlying stations.

A further object of this invention is to provide an aerial motor carriage adapted to travel on trolley wires and take current therefrom for its propulsion.

A further object of this invention is to provide an aerial motor carriage adapted to travel on trolley wires and take its current therefrom and also provided with means for automatically stopping the carriage at predetermined points.

A further object of this invention is to provide an aerial motor carriage adapted to travel on trolley wires and take its current therefrom and also provided with means for automatically stopping the carriage at predetermined stations and also provided with means for automatically reversing the direction of the driving devices to accomplish the return of the carriage to its starting point.

A further object of this invention is to provide improved selective means for stopping and reversing the direction of travel of an aerial motor carriage at any of several stations.

My invention consists in the construction, arrangement and combination of elements hereinafter set forth, pointed out in my claims and illustrated by the accompanying drawings, in which—

Figure 1 is a rear elevation of an aerial motor carriage embodying my invention, mounted in position for travel on trolley wires, shown in section, the driving gears being shown in neutral position. Fig. 2 is an elevation at right angles to the showing of Fig. 1. Fig. 3 is a side elevation, Fig. 4 a plan and Fig. 5 a longitudinal section of a station stopping device, on an enlarged scale.

As shown, trolley wires 10, 11 are employed, which trolley wires comprise portions of a return circuit electric system receiving electrical energy from any suitable source of supply, said wires being supported by and insulated from brackets 12 extending laterally from supporting devices such as poles 13, the wires being arranged one above the other in the same vertical plane. The trolley wires 10, 11 may be so arranged as to lead from a central station to a series of outlying stations such for instance as might be found on a mail route.

A carriage is provided and is adapted to travel on the trolley wires 10, 11 and comprises in the main a base 14 and an upright frame 15 of any suitable size and construction mounted on said base. Trolley wheels 16, 17, preferably of grooved construction, are fixed to shafts 18, 19 respectively spaced apart and journaled in bearings 20 carried by the upright frame 15, and said wheels are adapted to travel on the trolley wires 10, 11 respectively and support the carriage therefrom. The hubs of the pulleys 16, 17 are insulated from the shafts 18, 19 and from the frame 15 by flanged fiber or other suitable bushings 21, the flanges of which are shown in Fig. 1. Brush contact devices 22, 23 are suitably carried by and insulated from the frame 15 and are in contact with hubs of the wheels 16, 17 respectively and said brush devices are suitably connected by conductors 24, 25 with and adapted to supply current to a motor 26 mounted on the base 14 and employed to operate the driving mechanism of the carriage. A countershaft 27 is arranged in upright position and journaled for rotation in bearings in the upright frame 15 and base 14 and bevel gears 28, 29 are spaced apart on and fixed to said countershaft and mesh with and are adapted to drive bevel gears 30, 31 respectively fixed to inner ends of the pulley shafts 18, 19. To the inner end of the drive shaft 32 of the motor 26 is fixed a bevel pinion 33, and opposing bevel gears 34, 35 are spaced apart and fixed to a sleeve 36 slidingly mounted on and for rotation with the countershaft 27, by means of a spline 37. A set collar 38 on the countershaft limits downward movement of the sleeve 36 and opposing bevel gears. The opposing bevel gears 34, 35 are adapted to mesh selectively with, or be placed in neutral position relative to, the bevel pinion 33, whereby the countershaft 27 may be driven in either direction or remain idle as desired.

At each stopping station on the route is a stopping device which may be carried by a bracket 39 from a post 13. Each stopping device comprises a tube 40 horizontally arranged and fixed to a bracket 39; a rod 41 mounted for reciprocation in and lengthwise of the tube; a stop trigger 42 fixed to the central portion of the rod and projecting through a longitudinal slot 43 in the inner side of the tube; and a tension spring 44 coiled around the rod within the tube between said stop trigger and one end of the tube.

A reversing lever 45 is arranged transversely of the carriage in a horizontal plane and fulcrumed on a bracket 46 carried by the frame 15. The inner end of the reversing lever 45 is pivotally connected by a link 47 to the upright arm of a bell-crank lever 48 fulcrumed on a bracket 49 carried by the frame 15, and the horizontally extended arm of said bell-crank lever is formed with a fork 50 engaging the sleeve 36 between the opposing bevel gears 34, 35 and adapted to slide said devices on the countershaft 27 for selective engagement of the said gears with the pinion 33 or for neutral positioning relative thereto.

The outer end of the reversing lever 45 is extended beyond the frame 15 toward the supports of the device and is provided with a vertically arranged cross-head 51. A series of stop keys 52, in this instance six in number, are removably and replaceably mounted in the cross-head 51 and are vertically spaced therein. The stop keys 52 are of variant lengths and each is adapted for contact with a selected stopping device at a stopping station or delivery point, by engagement with the projecting trigger 42 of such stopping device. The stopping devices may be selectively arranged at different altitudes and on variant lines of projection from the supports, for selective engagement by the selected stop keys 52. By interchanging of keys 52 in the cross-head 51 a considerable range of permutations of variant altitude and projection may be secured to the end of serving, with a limited number of stop keys of different lengths, a considerable number of stopping and delivery stations.

In use the carriage is mounted on the trolley wires as shown and for forward travel of the device, in the direction indicated by the arrow in Fig. 2, the reversing lever 45 is set with its outer end, bearing the stop keys 52, in forward position, in which position the bevel gear 35 is in mesh with the bevel pinion 33 of the motor shaft 32 and the countershaft 27 is driven in such manner as to rotate the pulleys 16, 17 for forward travel on the wires 10, 11, through the bevel-gear connections of the pulley shafts 18, 19 to said countershaft. When the carriage reaches a stopping and delivery station at which a stopping device is arranged, by vertical position and lateral extension, for engagement of its trigger 42 by one of the stop keys 52, the lever 45 is oscillated by such contact in such manner as to lower the sleeve 36 on the countershaft 27 and disengage the bevel gear 35 from the bevel pinion 33, through the link 47 and forked bell-crank lever 48, thus stopping the forward movement of the carriage. On contact of the trigger 42 by a stop key 52 the rod 41 is reciprocated in the tube 40 and the spring 44 compressed, thereby cushioning the impact. Such oscillation of the reversing lever 45 also causes an engagement of the bevel gear 34 with the bevel pinion 33 of the motor shaft, thereby causing a reverse rotation of the countershaft and of the wheels 16, 17 on the trolley wires through the connections described, resulting in reverse travel of the carriage to the starting point. A snap switch of common form may be provided in the circuit to the motor 26 which motor may be stopped at stations for loading or unloading of the device or for any other purpose. Repeated trips of the carriage may be made to successive stations on the line, the key 52 applicable to each station being removed at the starting point upon the return of the carriage from that station and a different key 52 operating the reversing lever at a different station each time. At intervals different selective arrangement of the keys 52 in the cross-head 51 may be made for adapting the same keys for engagement with stopping devices at variant altitudes.

Any desired means may be employed for suspending or otherwise supporting a load relative to the carriage, which means is not herein shown nor described as it forms no part of my present invention.

The carriage is so arranged as to balance on the trolley wires and be held in substantially upright position.

If desired all or part of the carriage may be inclosed and protected by housing or shield devices, so arranged as not to interfere with the pulleys and their shafts or with the free operation of the reversing lever and members carried thereby.

I do not desire to be understood as limiting myself to the precise construction and arrangement of parts as herein shown and described, as various modifications, within the scope of the appended claims, may be employed without departing from the spirit of my invention.

I claim as my invention—

1. An aerial motor carriage, comprising a suitable frame, trolley wheels journaled in said frame, arranged one above the other and adapted to travel on separate conductor tracks, a motor carried by said frame, suitable electrical connections for supplying current from one of said wheels through said motor, and driving connections between said motor and said trolley wheels.

2. An aerial motor carriage, comprising a suitable frame, trolley wheels journaled in said frame, arranged one above the other and adapted to travel on separate conductor tracks, a motor carried by said frame, suitable electrical connections for supplying current from one of said wheels through said motor to the other wheel, and reversible driving connections between said motor and said trolley wheels.

3. An aerial motor carriage, comprising a suitable frame, trolley wheels journaled in said frame, arranged one above the other and adapted to travel on separate conductor tracks, a motor carried by said frame, suitable electrical connections for supplying current from one of said wheels through said motor to the other wheel, a shaft journaled in said frame, gear connections between said shaft and the trolley wheels, and clutch connections between said motor and said shaft for driving the latter in either direction.

4. An aerial motor carriage, comprising a suitable frame, trolley wheels journaled in said frame, arranged one above the other and adapted to travel on separate conductor tracks, a motor carried by said frame, suitable electrical connections for supplying current from one of said wheels through said motor to the other wheel, a shaft journaled in said frame, gear connections between said shaft and the trolley wheels, the motor shaft being formed with a bevel pinion, and opposing bevel gears feathered on said first shaft and adapted for selective engagement with said bevel pinion.

5. An aerial motor carriage, comprising a suitable frame, trolley wheels journaled in said frame and adapted to travel on a track and take current therefrom, a motor carried by said frame, suitable connections for supplying current from said wheels to said motor, a shaft journaled in said frame, gear connections between said shaft and the wheels, clutch connections between said motor and said shaft for driving the latter in either direction, and a lever fulcrumed on said frame and engaging the clutch devices between the motor and shaft, said lever being adapted for engagement by contact devices to operate said clutch connections and automatically reverse the direction of travel of the device.

6. An aerial motor carriage, comprising a suitable frame, trolley wheels journaled in said frame and adapted to travel on a track and take current therefrom, a motor carried by said frame, suitable connections for supplying current from said wheels to said motor, a shaft journaled in said frame, driving connections between said shaft and the wheels, the motor shaft being provided with a bevel pinion, opposing bevel gears feathered on said shaft and adapted for selective engagement with said pinion, and a lever fulcrumed on said frame and provided with loose connections to said opposing bevel gears, said lever being adapted for engagement and oscillation by contact devices to shift said opposing bevel gears and automatically reverse the direction of travel of the device.

7. An aerial motor carriage, comprising a suitable frame, trolley wheels journaled therein and adapted to travel on and take current from a track, a motor carried by said frame, suitable connections for supplying current from said wheels to said motor, a shaft journaled in said frame, driving connections between said shaft and wheels, the motor shaft being provided with a bevel pinion, opposing bevel gears feathered on said shaft and adapted for selective engagement with said pinion, and a lever fulcrumed on said frame and provided with loose connections to said opposing gears, said lever being provided with a plurality of stop keys adapted for selective engagement with variant contact devices, whereby the direction of travel of the device may be reversed automatically at selected stations on its line of travel.

8. In a device of the class described, the combination of a reversing lever, a plurality of stop keys of variant lengths mounted in said reversing lever, and a plurality of stopping devices variably arranged for selective engagement with said stop keys for oscillating said lever.

9. In a device of the class described, the combination of a reversing lever, a plurality of stop keys of variant lengths removably and replaceably and interchangeably carried by said lever, and a plurality of stopping devices variably arranged as to altitude and lateral projection and adapted for engagement by selected stop keys to oscillate said lever.

10. In a device of the class described, the combination of a reversing lever, a plurality of stop keys of variant length carried by said reversing lever, and a plurality of cushioned stopping devices variably arranged for selective engagemt with said stop keys to oscillate said lever.

11. An aerial motor carriage, comprising a suitable frame, trolley wheels journaled in said frame, one above the other and adapted to travel on separate tracks, a motor carried by said frame, an upright shaft journaled in said frame, gear connections between said shaft and the trolley wheels, and clutch connections between said motor and the upright shaft.

12. An aerial motor carriage, comprising a suitable frame, trolley wheels journaled in said frame, one above the other and adapted to travel on separate tracks, a motor carried by said frame, an upright shaft journaled in said frame, driving connections between said motor and upright shaft, and driving connections in different horizontal planes between said upright shaft and the trolley wheels.

THEODORE WM. NYSTROM.

Copies of this patent may be obtained for five cents each, by addressing the "Commissioner of Patents, Washington, D. C."